Nov. 26, 1940.   G. T. DOWNEY   2,223,247
POPPET VALVE
Original Filed Dec. 27, 1938
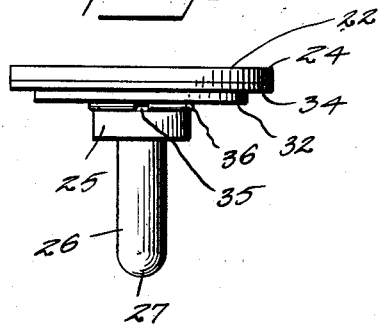
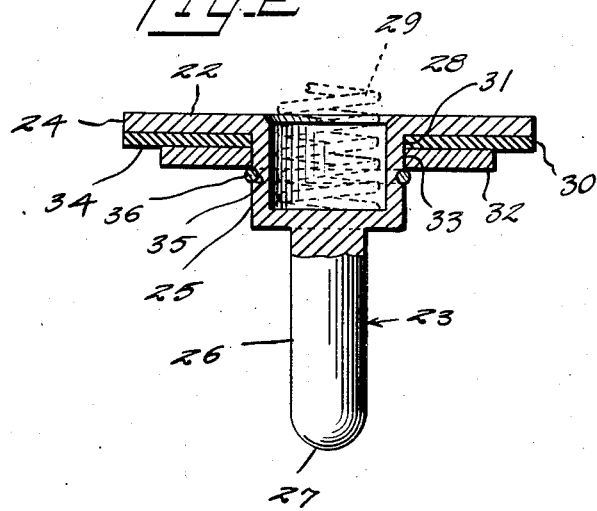
Inventor
G. T. Downey
By Kimmel & Crowell
Attorneys Patented Nov. 26, 1940

2,223,247

UNITED STATES PATENT OFFICE 2,223,247

POPPET VALVE

George T. Downey, Corry, Pa., assignor to Aero Supply Manufacturing Co., Inc., Corry, Pa.

Original applications December 27, 1938, Serial No. 247,909, and July 13, 1939, Serial No. 284,313. Divided and this application October 6, 1939, Serial No. 298,325

1 Claim. (Cl. 251—160)

This invention relates to valves and is a division of my co-pending applications, Serial No. 247,909 filed December 27, 1938, for Valve structures, and also Serial No. 284,313 filed July 13, 1939, for Valve assembly.

An object of this invention is to provide an improved poppet valve wherein the head portion thereof is provided with a replaceable or renewable gasket so that a worn valve may be quickly and easily renewed without the necessity of grinding the new valve on the seat.

Another object of this invention is to provide an improved valve which is designed for use in closing a fluid port and which will effectively close a port through which gasoline or other fluids are adapted to flow.

A further object of this invention is to provide a poppet valve which is so constructed that it will effectively close a gasoline port without grinding the valve on the valve seat.

A still further object of this invention is to provide a poppet valve which is formed with a metal body including a metal head and an integral stem, a composition disc-shaped gasket, and an improved clamping means for removably holding the gasket against the head.

A further object of this invention is to provide an improved poppet valve for use with a valve assembly as embodied in my co-pending applications hereinbefore mentioned in which the valve is provided with a socket or recess opening through the side thereof opposite from the stem so that a relatively small spring may be used to hold the valve seated and so that the fluid will not be required to pass through the convolutions of the spring.

A further object of the invention is to provide, in a manner as hereinafter set forth, a poppet valve structure including a gasket and with the latter so arranged, relative to the other elements of the structure to prevent the gasket buckling.

A further object of the invention is to provide, in a manner as hereinafter set forth, a poppet valve structure including a clamping plate and a non-buckling radially expansible gasket and with the latter having a part extended from its clamping plate to constitute a reinforced valve seat engaging portion.

A further object of the invention is to provide, in a manner as hereinafter set forth, a poppet valve structure including a valve head in the form of a flat annulus, a stem integral with and extending laterally from one side thereof and with the stem having an outer enlarged hollow portion and a reduced solid rear portion, said outer portion of the stem having its inner face flush with the inner edge of the head, a gasket encompassing the outer portion of the stem, corresponding in diameter to and having one side positioned throughout against the said side of the head, a flat clamping plate mounted on the outer portion of the stem, of less diameter than the gasket and having one side throughout bearing against the other side of the gasket and means encompassing and seated in the periphery of the outer portion of the stem for holding the head, gasket and plate in abutting relation, the arrangement being such as to prevent subjecting the gasket to a torsional shearing force, to prevent the buckling of the gasket and to permit of the radial expansion of the gasket.

To the foregoing objects and to others which may hereinafter appear, the invention consists of the novel construction, combination and arrangement of parts as will be more specifically referred to and illustrated in the accompanying drawing wherein is disclosed embodiments of the invention, but it is to be understood that changes, variations and modifications may be resorted to which fall within the scope of the invention as claimed.

In the drawing:

Figure 1 is a detail side elevation of a poppet valve constructed according to an embodiment of this invention and as disclosed in my co-pending applications, Serial No. 247,909 filed December 27, 1938, and Serial No. 284,313 filed July 13, 1939, and Figure 2 is an enlarged vertical section partly in detail of the structure shown in Figure 1.

In the drawing there is disclosed a form of valve structure including an axially apertured head 22 and a stem generally designated as 23. The head 22 has a disc-like configuration and is provided with a right angular or cylindrical marginal edge 24. The stem 23 is formed integral with the head 22 and comprises an upper stem portion 25 and a lower stem portion 26. The stem portion 26 is substantially smaller in diameter than the upper stem portion 25 and is provided at its lower end with a rounded end 27 which is adapted to engage with a suitable valve lifting means for lifting the valve into open position. The upper stem member 25 is provided with a central and upwardly opening socket or recess 28 within which a valve compressing spring 29 is adapted to engage. The inner face of the member or outer portion 25 of the stem is flush with the inner edge of the head 22. A gasket 30 of composition material is adapted to engage against the underside of the head 22 and is provided with a central opening 31 in which the stem or socket member 25 is received. A clamping plate 32 provided with a central opening 33 engages about the stem member 25 and against the underside of the gasket 30. The clamping plate 32 of disc-like configuration and has a diameter substantially less than the diameter of the gasket 30 thereby forming a seat engaging portion 34 outwardly of the periphery of the clamping plate 32. The stem member or socket 25 is provided with a peripheral groove 35 in which a holding spring 36 is adapted to removably engage. The spring ring 36 is of split construction and engages against the underside of the clamping plate 32 for holding the clamping plate 32 against the gasket 30 and holding gasket 30 against the underside of the head 22.

The gasket 30 is formed of composition material similar to the construction of the gasket 14, being formed of such material as will not be materially affected by fluids such as gasoline or the like.

A poppet valve formed in accordance with this invention will provide a valve structure which can be easily and quickly assembled and can be combined with a valve assembly similar to that shown in my co-pending applications in such a manner that it is not necessary to grind the valve head onto the valve seat as is customary where a metal valve head engages a metal valve seat. This valve structure also permits the quick replacement of the seat engaging portion thereof in the event the gasket becomes worn so that the valve leaks. This replacement may be accomplished by expanding the holding spring 36 and the expanding of such spring or ring would release the clamping plate so that the gasket may be removed and a new gasket applied.

This valve structure has been particularly designed for use in valves which are associated with a fuel supply line for an internal combustion engine such as an airplane engine and is adapted to be interposed in a valve assembly which is connected between the engine and the fuel supply tanks. Heretofore in valve structures connected to airplane engines for connecting the engine to one of a number of fuel supply tanks the valves have been ground onto the valve seats and when these valves become worn or otherwise in a condition where they will not adequately close the valve ports it is necessary to regrind the valves onto the valve seats. This heretofore has necessitated the return of the valve assemblies to the factory where special machinery has been set up to regrind the valves onto the valve seats. However, with a valve structure as shown herein it is only necessary to take the valve assembly apart and then withdraw the valve members from the valve housing and renew the gasket as hereinbefore stated. These gaskets are of such a composition that they will not unduly swell upon contact with a fluid or liquid passing through the valve assembly and when a new gasket has been mounted on the valve structure this new gasket will automatically conform to the configuration of the seat in the event the seat is not perfect. In addition to this the provision of a composition seat engaging means carried by the valve head provides a structure wherein the valve will not leak in the event a small article such as a fiber or granular article is caught between the gasket and the valve seat. Where this occurs the gasket will not be tilted as is the case with a solid head, but will be indented by the article engaging between the gasket and the seat so that a small article of this character will not have the effect of holding the valve in partly open position.

The advantage of the poppet valve structure as hereinbefore set forth, is such that the parts are so arranged and constructed whereby the gasket is prevented from buckling and is not subjected to a torsional shearing force from the clamping plate and furthermore is capable of radial expansion.

What I claim is:

A poppet valve comprising a head formed of a flat annulus, a stem integral with and extending laterally from one side of said head, said stem having an enlarged outer hollow portion and a reduced solid rear portion, said outer portion being open at its outer end and closed at its inner end, the forward end of said rear portion being integral axially with the inner end of the outer portion, said outer portion having its forward end integral with the said side of the head and having its inner face forming a rearward continuation of the inner edge of the head, said outer portion being formed in its outer periphery intermediate its ends with a circumferentially extending endless groove, a flat gasket surrounding and bearing against the outer periphery of the said outer portion, bearing throughout against the said side of and having its outer edge flush with the outer edge of said head, a flat disc-like clamping plate having an axial opening, said plate encompassing said outer portion and of a diameter less than the outer diameter of the gasket to thereby provide the latter with a reinforced valve seat engaging portion outwardly of said plate, said plate being interposed between the outer side of said groove and said gasket having its forward side bearing throughout thereof against the rear side of the gasket, and an annular resilient removable means mounted in and extending from said groove and bearing against the rear side of the plate for holding the latter, said gasket and said head in abutting relation.

GEORGE T. DOWNEY.